US007124375B1

(12) United States Patent
Steele et al.

(10) Patent No.: US 7,124,375 B1
(45) Date of Patent: Oct. 17, 2006

(54) COLOR MONITORING AND ANALYSIS FOR COLOR VISION DEFICIENT INDIVIDUALS

(75) Inventors: Heidi Steele, Port Orchard, WA (US); Ursula Schwuttke, Dana Point, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/571,876

(22) Filed: May 11, 2000

Related U.S. Application Data

(60) Provisional application No. 60/133,457, filed on May 11, 1999.

(51) Int. Cl.
*G06F 3/00* (2006.01)
*G06F 3/14* (2006.01)
*G06F 17/00* (2006.01)

(52) U.S. Cl. ...................... 715/865; 715/771; 715/772; 345/589; 345/591; 345/593; 340/825.19; 434/112

(58) Field of Classification Search ........ 345/589–591, 345/593, 764, 765, 771, 772, 865; 434/112, 434/117; 340/825.19; 715/764–765, 771–772, 715/865
See application file for complete search history.

(56) References Cited

U.S. PATENT DOCUMENTS 5,339,389 A * 8/1994 Bates et al. ................. 345/742
5,408,603 A * 4/1995 Van de Lavoir et al. ... 345/763
5,475,835 A * 12/1995 Hickey .................... 707/104.1
5,995,112 A * 11/1999 Goff et al. .................. 345/589
6,052,676 A * 4/2000 Hekmatpour ................ 706/11
6,087,954 A * 7/2000 McSpadden et al. ... 340/825.19
6,211,880 B1 * 4/2001 Impink, Jr. ................. 345/418
6,624,828 B1 * 9/2003 Dresevic et al. ............ 345/771

OTHER PUBLICATIONS

James E. Kester, "Individually Tuned Color Enhancements for Imagery Interpretation by Color-Impaired Users," 1990, IEEE, vol. 2, pp. 761-762.*

Gary W. Meyer et al, "Color Defective Vision and Computer Graphic Displays," 1988, IEEE, pp. 28-40.*

U.S. Appl. No. 60/118,087, filed Feb. 1, 1999.*

* cited by examiner

*Primary Examiner*—X. L. Bautista
(74) *Attorney, Agent, or Firm*—Fish & Richardson P.C.

(57) ABSTRACT

Displaying information to a user which includes categories of information to be displayed. The categories are displayed with each color representing a specific category, where the different categories can include at least an alarm category and a non-alarm category. Colors are selected for the two categories which can be perceived by both red dichromats and blue dichromats, and in this way, many colorblind individuals will still be able to discern between alarms and non-alarms.

11 Claims, 8 Drawing Sheets
(6 of 8 Drawing Sheet(s) Filed in Color)

COLOR MONITORING AND ANALYSIS FOR COLOR VISION DEFICIENT INDIVIDUALS

This application claims the benefit of U.S. Provisional Application No. 60/133,457, filed May 11, 1999.

BACKGROUND

Color Vision Deficiency is present in a percentage of the human population. Certain tasks which rely on color can become more challenging for these people.

Computer workstation tasks are often highly color dependent. Consider, for example, web browsing. Web browsers may indicate a link that has been visited in one color, and a link that has not been visited in another color. A person who cannot distinguish between the two colors simply misses the cue.

Non-color cues, such as text icons, graphics and so on can be used in conjunction with the colored cues. This technique works well in web page design. Other interfaces, which are more intensely visual, often cannot use this technique.

SUMMARY

The present application teaches a fault display system which can be selected to use a special color scheme that is color—which may be more viewable by people having color vision deficiencies.

BRIEF DESCRIPTION OF THE DRAWINGS

The file of this patent contains at least one drawing executed in color. Copies of this patent with color drawing(s) will be provided by the Patent and Trademark Office upon request and payment of the Necessary Fee.

These and other aspects will now be described in detail with reference to the accompanying drawings, wherein.

DETAILED DESCRIPTION

The basis of vision is special photosensitive cells called rods and cones in the retina of an eye. The cone cells each include a light sensitive pigment that is sensitive to wavelengths in three parts of the visible light spectrum. The cones receive information for three colors which are often called the primary colors; red, green and blue.

People with normal vision are often called trichromats. They are sensitive to color in all three areas of the light spectrum. If the genetic code that forms the pigments is incorrect, then cone cells that include the pigments may be sensitive to different wavelengths of light. People with color vision deficiencies are referred to as anomalous trichromats. These people can see the color in all the ranges but are less sensitive to either green or red then are people with normal vision.

Other people with color vision deficiencies are called dichromats. These dichromats often have no sensitivity to one of the colors, usually either green or red.

The four common types of color vision deficiency are summarized below:

| Color Vision Deficiency | Category | Description |
|---|---|---|
| Green insensitive (deuteranomalous trichromat) | Anomalous trichromat | Person is less sensitive to greens |
| Red insensitive (protanomalous trichromat) | Anomalous trichromat | Person is less sensitive to reds |
| Green blind (deuteranope) | Dichromat | Person can't see greens at all |
| Red blind (protanope) | Dichromat | Person can't see reds at all |

Some studies provide surprising numbers about how many people have such deficiencies. As many as 8% of Caucasian men have some degree of color vision deficiency. An order of magnitude fewer women have that deficiency.

The reliance on color to indicate critical information may prevent people with color vision deficiencies from effectively appropriately using certain tools. The present application addresses this problem.

A display which shows faults and parameters is, such as that described in our co-pending application Ser. No. 08/797,769. This display uses the standard, conventionally used colors, e.g., green, red and yellow to distinguish between normal, critical and warning, values of parameters respectively. For example, green can mean that the data is within limits and does not require any analysis or attention. Yellow can mean that data is out of limits and in a warning level state. Red can mean that the data is out of limits and in a critical state. This system also displays "towers", the height of which indicates the percentage different from some normal, or baseline, value. This system may be very powerful, since it enables perceiving large amounts of information. However, without the ability to interpret certain color cues, an analyst could be limited in their ability to determine the state of the data parameters.

Figure 1A:
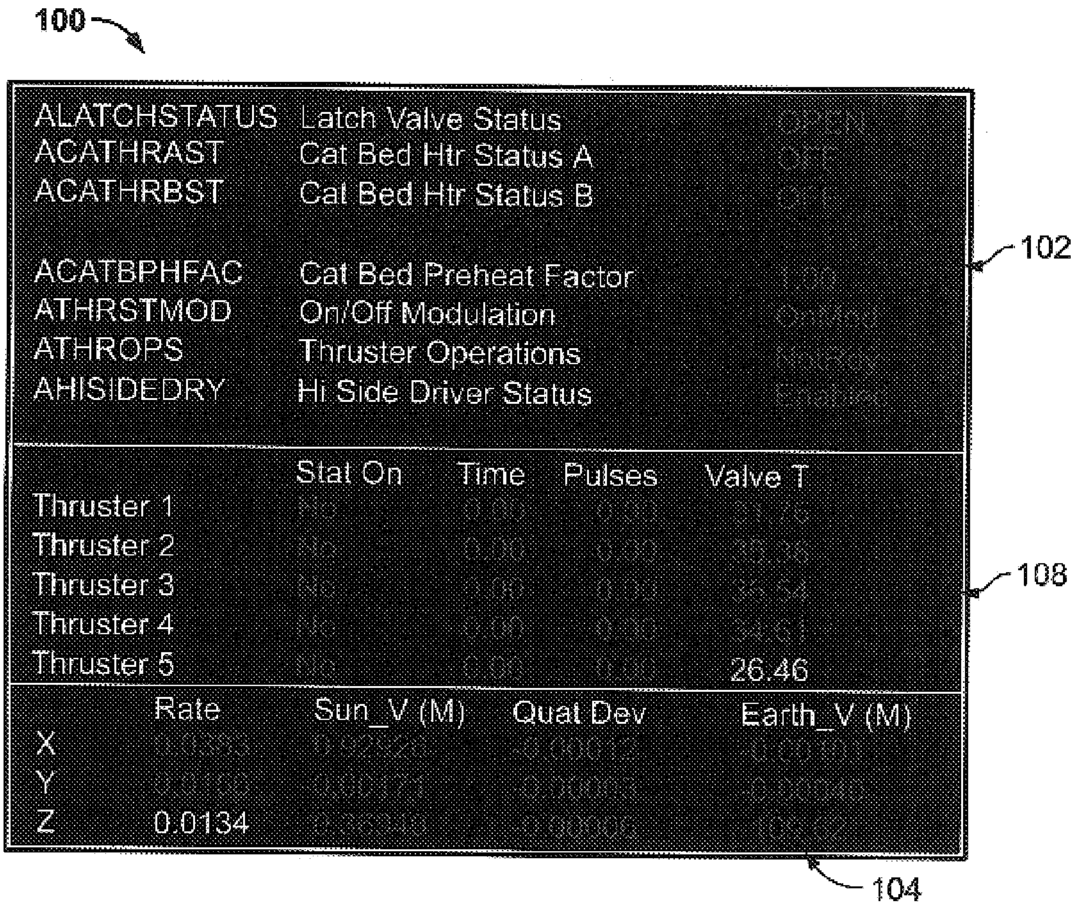
FIG. 1A shows the basic screen in color, showing different alarms and different aspects of these different alarms.

FIG. 1A shows a screen showing data parameters. A plurality of data parameters are shown along with their colors. The parameter titles are in white, and their values are shown displayed in green if normal, yellow if warning, or red if alarmed. The parameters for the thrusters 102, 104 are in alarm states and hence shown as red. The thruster 5, value 108, is shown in yellow.

A normal color-sighted person would see the text in FIG. 1A as white text, the values as green and red and yellow. In the screen of FIG. 1, the values such as 100 are all green. The values 102,104 are red indicating alarm. The value shown as 108 is shown as yellow, indicating a fault.

While this color scheme may be best for normal sighted people, a red blind dichromat does not see the red values. The red blind dichromats sees the green values as some other color, which can be thought of a version of green. In commonly used black display backgrounds, red also offers almost no contrast with the background, making the serious condition the easiest for a person with color vision deficiency to overlook.

The following figures show certain information as it is believed that the dichromat will perceive them. These may be worst case analyses.

Figure 1B:
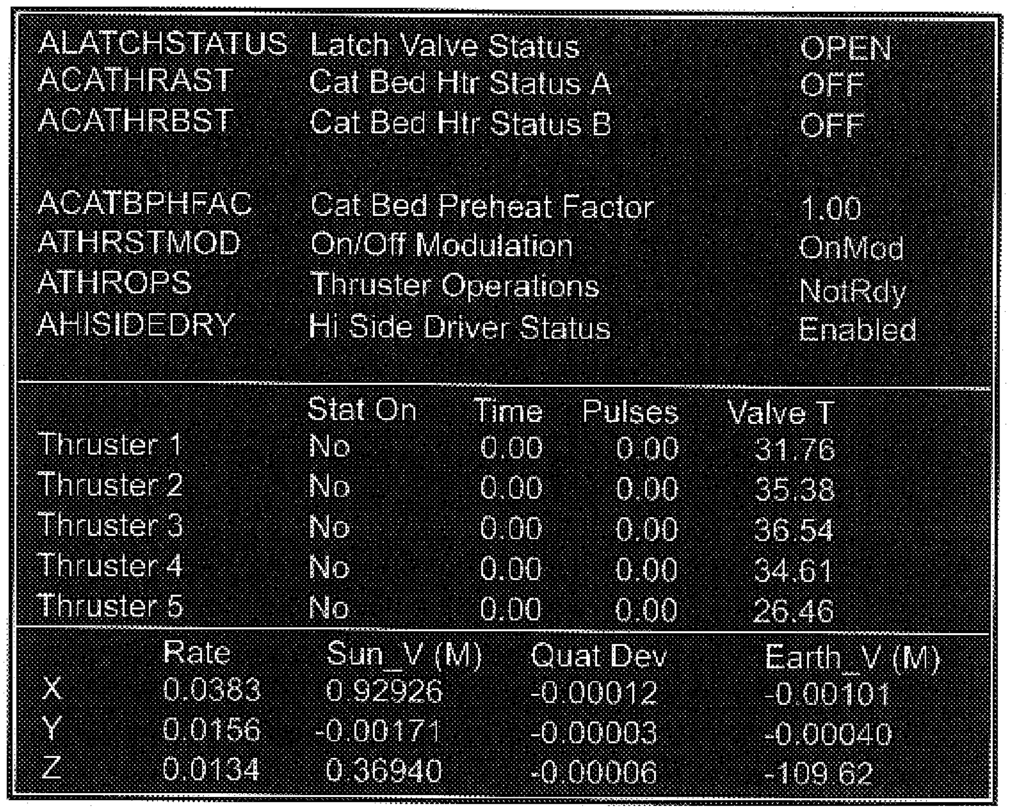
FIG. 1B shows how these alarms might be perceived by certain color blind people.

FIG. 1B shows the view that might be seen by a red blind dichromat. Since the red cannot be perceived, those values would be seen as a shadowy view of the words represented by the alarm. The yellow value here, 108, is seen by the red blind dichromat as virtually yellow. The yellow values become virtually indistinguishable from the green.

For this case, the fault values may become less visible. Hence, critical information can be completely lost by a color impaired sight person.

Figure 2A:
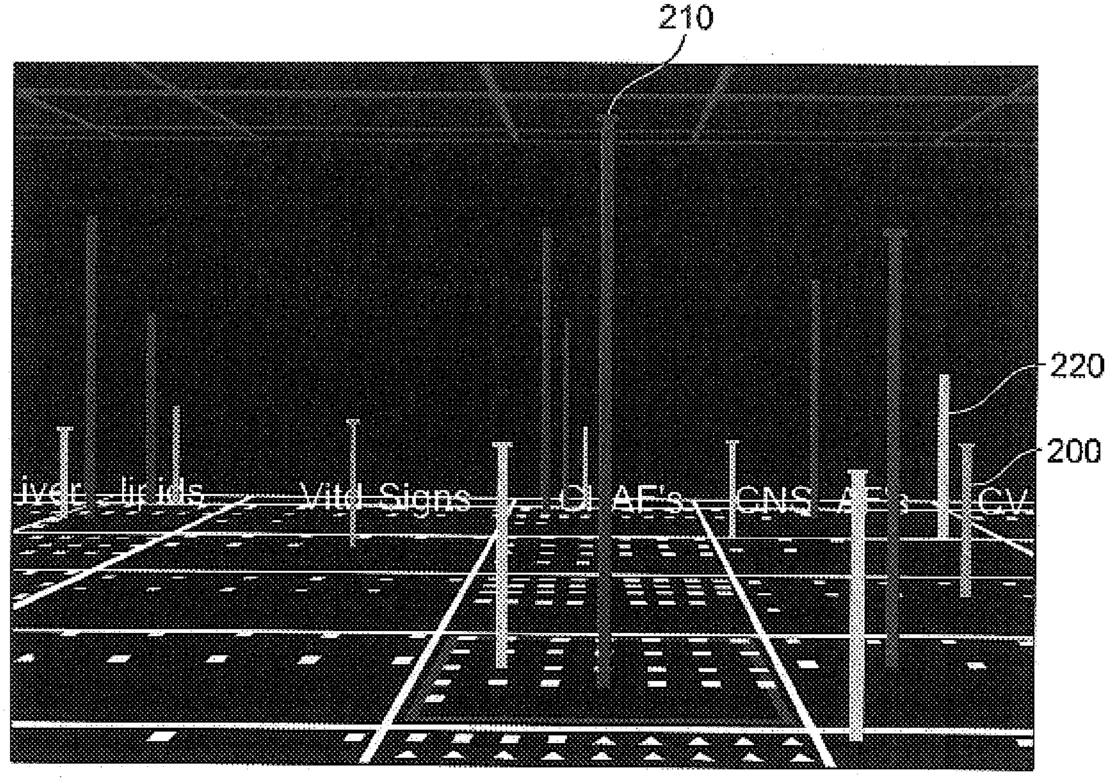
FIG. 2A shows the basic TowerView system, with alarms whose height represents an anomaly between normal and alarms.
Figure 2B:
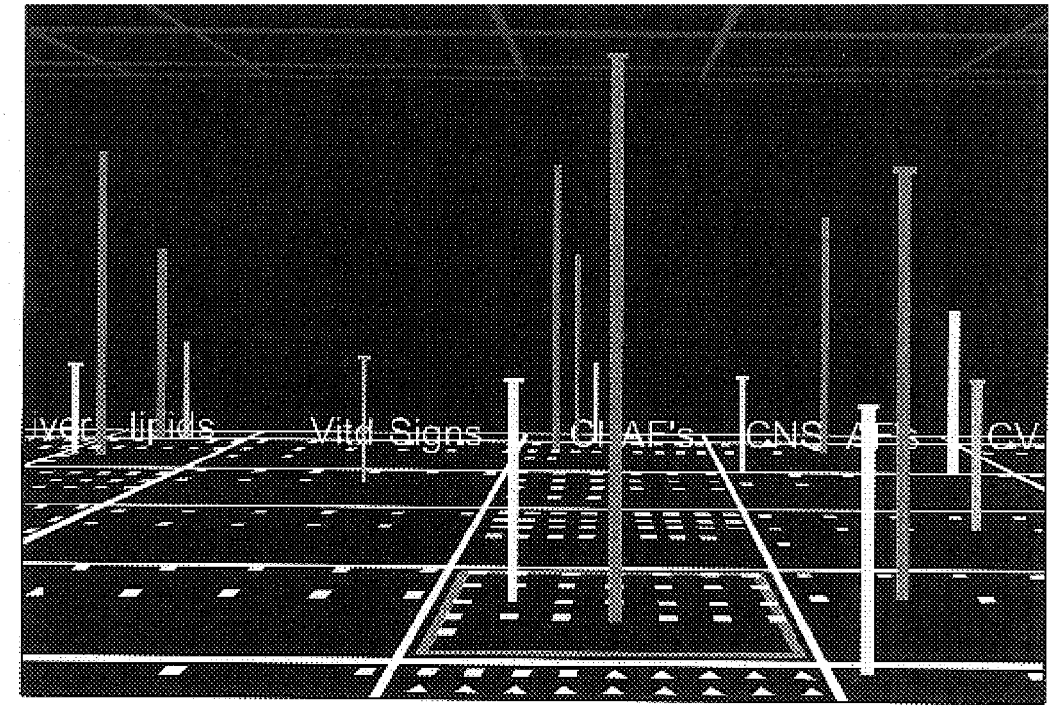
FIG. 2B shows how this would be viewed by a green blind dichromat.

The system used by TowerView is shown in FIG. 2A. Blue may be used as an advisory color, yellow as a warning color, and red as a critical color. This display shows a plurality of different parameters all displayed on one display. The height of the towers represents the amount of difference between that parameter's current value and normal. Taller towers represent more severe faults. This enables quickly determining which parameters are in alarm. This system calls attention to the parameters that are exhibiting anomalous behavior, and de-emphasizes those that do not require action on the part of the analyst. If all of the objects in the CyberGrid represent normal parameters, then all would compete for the analyst's attention. While this use of color may make it possible to grasp large quantities of information, the use of color also poses the usual problems for persons with color vision deficiency. FIG. 2A shows the portion of a CyberGrid display in the default color scheme. The view in FIG. 2 shows red alarms 210, blue alarms 200, and yellow alarms 220. A green blind dichromat, however, sees only the dichromic view shown in FIG. 2B. The red alarms blend in to the black background. Blue alarms do not display distinctly from gray data objects. Much of the effect of this system is lost on the color blind.

Figure 2C:
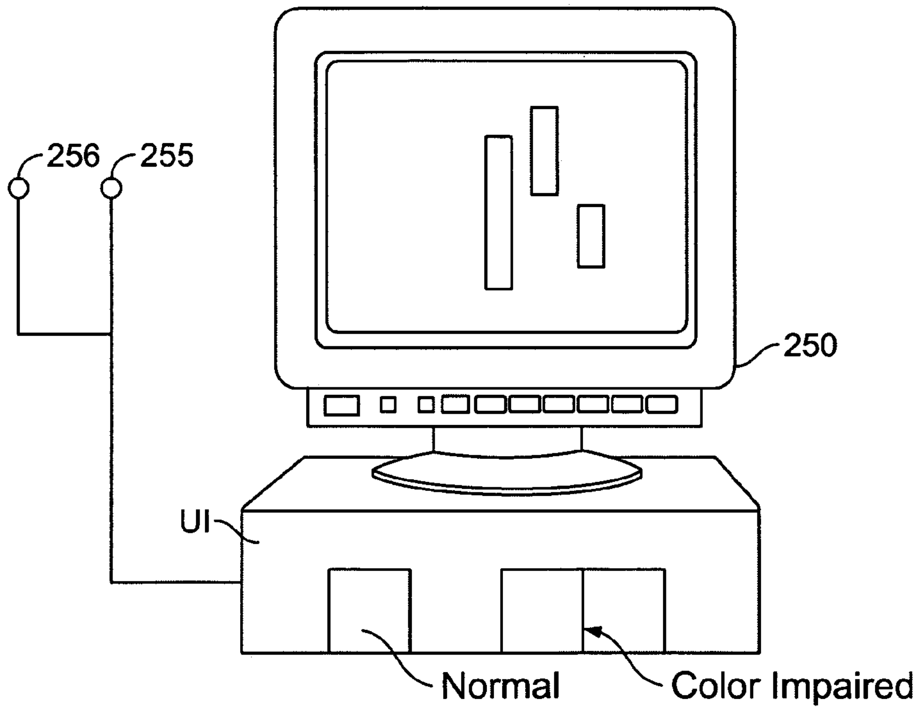
FIG. 2C shows a basic computer system that is used according to the present system.

FIG. 2C shows the computer 250 used to display these display parts. The computer runs a program to display the display shown in FIG. 2A. The user interface 252 enables selection between the normal color scheme of FIG. 2A, or a color blind-preferred color scheme described herein. The program also receives input from plural sensors 255, 256.

The present application teaches a color scheme for the color blind which is selectable by a user. The system allows switching to an alternative color scheme, which can be more easily perceived by the color blind. The system uses colors which can be easily differentiated by all the different kinds of color blind people, with all the different kinds of color blindness. The system can also operate advantageously for the different types of color blindness. In a particular embodiment, a color scheme is optimized for viewing by all or many of the different kinds color vision impaired.

In this way, the colors can be changed in a way that allows the different users to see differently. Other embodiments are within the disclosed embodiment. For example, other color schemes are contemplated.

Figure 3A:
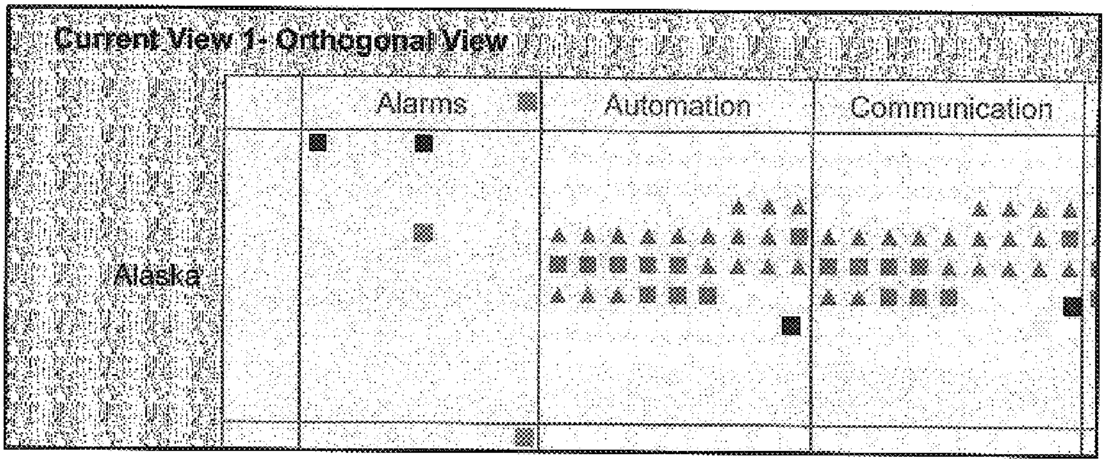
FIG. 3A shows a basic color scheme.
Figure 3B:
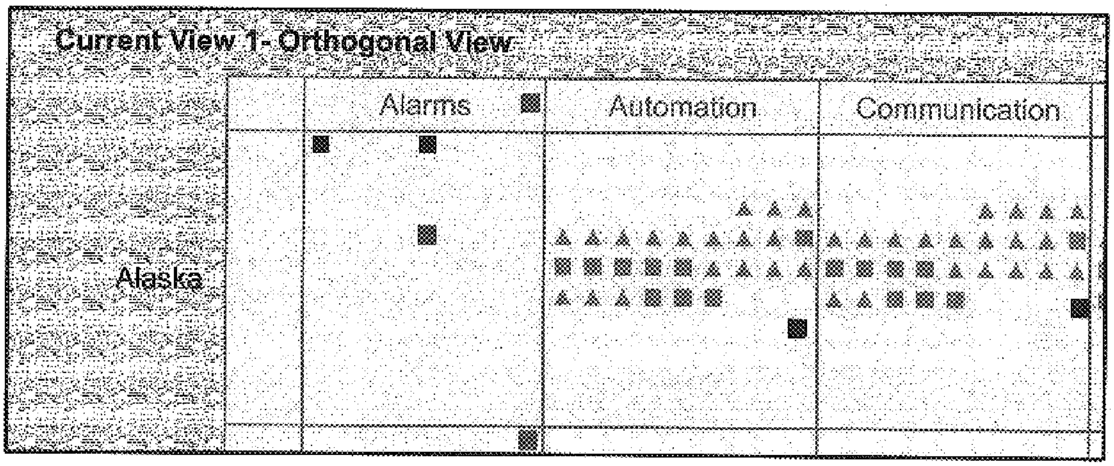
FIGS. 3B and 3C show how this color scheme would be viewed by different kinds of dichromats.
Figure 3C:
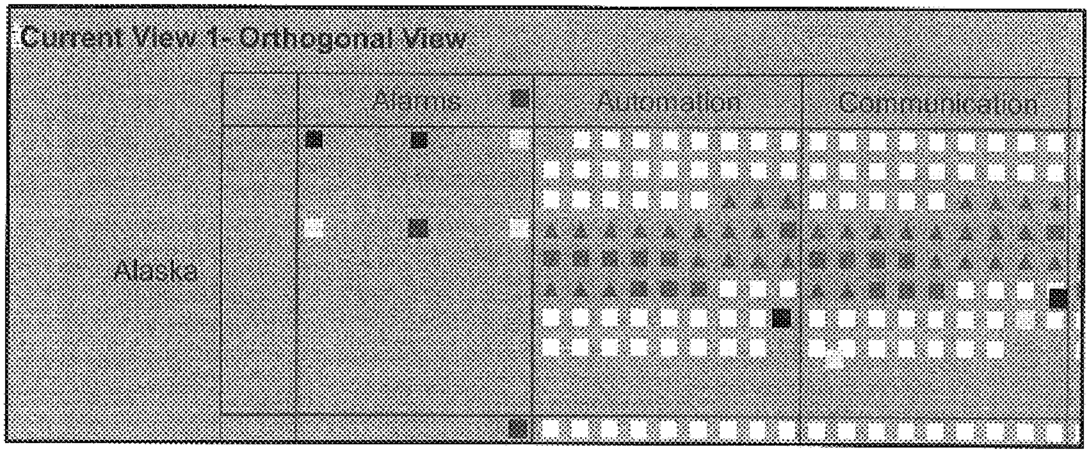

A system shown in FIGS. 3A–3C is for the color blind. The background is gray. Alarms are blue, yellow and black, and normal colors are green. FIG. 3A shows this view. FIG. 3B shows the view that would be perceived by a green blind dichromat. The greens would appear slightly less green, but the alarms would still be viewable. Similarly, a red blind dichromat sees the view shown in FIG. 3C. The background is seen as being greenish, and the viewer also sees the yellow, blue and black. For dichromats of both types, the colors of the towers are all markedly different and in high-contast from one another and from their surroundings.

Figure 4:
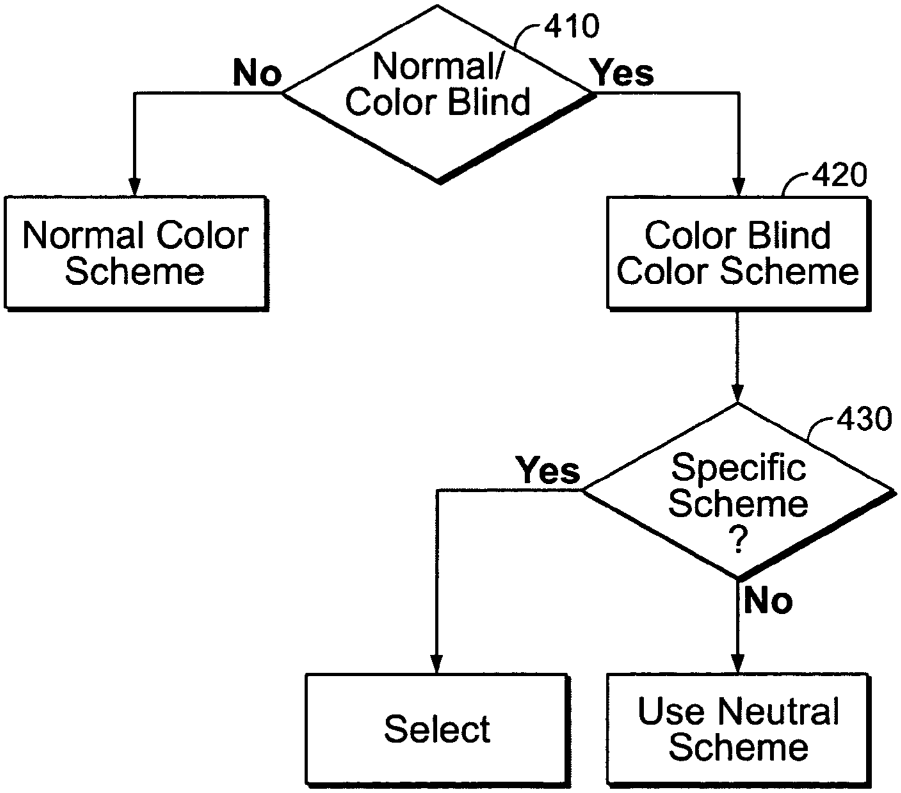
FIG. 4 shows a flowchart of operation to either select a special color scheme for color blind people, or to use the default scheme.

A flowchart of operation is shown in FIG. 4. This flowchart can be executed by the computer 250.

In FIG. 4, different parameters are viewed in different ways.

At 410, the user of the system actuates a user interface control which indicates whether the system is being used by a color blind person. The normal color scheme goes to direction N, where the parameters are viewed in a normal color scheme. For example, normal parameters can be viewed in a normal color scheme such as green, yellow, red or some other normal indicative color. Alarms are preferably shown in red, while warning colors are shown in yellow.

Color blind follows the "C" path, and the color scheme is changed to one which is easier to view by color blind people at 420. At 430, an optional operation is carried out whereby the user is given the opportunity to specify a specific type of color blindness, and a color scheme for that. If not, the scheme noted above, which is usable for all different kinds of color blindness, is used. Alternatively, the user can continue to change color schemes until they find one that fits them best. As part of the display in FIG. 430, the user can be asked to select a color scheme they can see best, using a plurality of displayed tests. The tests provide color schemes, and the user is asked which of the multiple color schemes they can most easily perceive. That color scheme can be selected for the user to view.

Other modifications are contemplated. For example, while only a single color scheme has been described herein, other color blind type schemes can be used. A scheme is preferably used that can be seen by all different kinds of dichromats.

The attached figures show these color schemes in color. However, as with many colors, these can also be described in terms of words, as below. It should also be understood that many of these drawings show what we believe that the dichromats may perceive.

| | Default Scheme | | |
|---|---|---|---|
| CyberGrid Elements | Color | RGB | Hex |
| 1. Upper grid | Medium Blue | 0-112-255 | 00-70-FF |
| 2. Lower grid | White | 255-255-255 | FF-FF-FF |
| 3. Advisory tower | Medium Blue | 28-120-237 | 99-BF-CC |
| 4. Warning tower | Yellow | 255-255-0 | FF-FF-0 |
| 5. Critical tower | Red | 255-0-0 | FF-0-0 |
| 6. Objects (receiving data) | White | 255-255-255 | FF-FF-FF |
| 7. Objects (not receiving data) | Gray | 171-171-171 | AB-AB-AB |
| 8. Quick summary | Medium Blue | 38-179-143 | 26-B3-8F |
| 9. Column labels | White | 255-255-255 | 0-FF-0 |
| 10. Row labels | White | 255-255-255 | FF-FF-FF |
| 11. Text on background | Medium Blue | 38-179-143 | 26-B3-8F |
| 12. Background | Black | 0-0-0 | FF-FF-FF |
| 13. Data suppression | Medium Blue | 0-112-255 | 00-70-FF |

| | Color Blind Scheme 1 | | |
|---|---|---|---|
| CyberGrid Elements | Color (what it looks like to the color blind is in parentheses) | RGB | Hex |
| 1. Upper grid | Medium blue (medium blue) | 0-102-255 | 0-66-FF |
| 2. Lower grid | Dark blue (dark blue) | 0-51-102 | 0-33-66 |
| 3. Advisory tower | Blue (blue) | 102-102-255 | 66-66-FF |
| 4. Warning tower | Gold (gold) | 255-204-0 | FF-CC-0 |
| 5. Critical tower | Black (black) | 0-0-0 | 0-0-0 |
| 6. Objects (receiving data) | White (beige) | 255-255-255 | FF-FF-FF |
| 7. Objects (not receiving data) | Dark green (dark brown) | 51-102-0 | 33-66-0 |
| 8. Quick summary | Dark blue (dark blue) | 0-51-102 | 0-33-66 |
| 9. Column labels | Dark blue (dark blue) | 0-51-102 | 0-33-66 |
| 10. Row labels | Dark blue (dark blue) | 0-51-102 | 0-33-66 |
| 11. Text on background | Dark blue (dark blue) | 0-51-102 | 0-33-66 |
| 12. Background | Gray (tan and gray) | 153-153-153 | 99-99-99 |
| 13. Data suppression | Medium blue (medium blue) | 0-102-255 | 0-66-FF |
| 14. Upper grid | Medium blue (medium blue) | 0-102-255 | 0-66-FF |
| 15. Lower grid | White (beige) | 255-255-255 | FF-FF-FF |
| 16. Advisory tower | Blue (blue) | 102-102-255 | 66-66-FF |
| 17. Warning tower | Gold (gold) | 255-204-0 | FF-CC-0 |
| 18. Critical tower | Black (black) | 0-0-0 | 0-0-0 |
| 19. Objects (receiving data) | White (beige) | 255-255-255 | FF-FF-FF |
| 20. Objects (not receiving data) | Red (green/brown) | 255-0-0 | FF-00-00 |
| 21. Quick summary | White (beige) | 255-255-255 | FF-FF-FF |
| 22. Column labels | White (beige) | 255-255-255 | FF-FF-FF |
| 23. Row labels | White (beige) | 255-255-255 | FF-FF-FF |
| 24. Text on background | White (beige) | 255-255-255 | FF-FF-FF |
| 25. Background | Rose (tan/gray) | 255-153-153 | FF-99-99 |
| 26. Data suppression | Medium blue (medium blue) | 0-102-255 | 0-66-FF |

| | Color Blind Scheme 2 | | |
|---|---|---|---|
| CyberGrid Elements | Color (what it looks like to the color blind is in parentheses) | RGB | Hex |
| 14. Upper grid | Medium blue (medium blue) | 0-102-255 | 0-66-FF |
| 15. Lower grid | White (beige) | 255-255-255 | FF-FF-FF |
| 16. Advisory tower | Blue (blue) | 102-102-255 | 66-66-FF |
| 17. Warning tower | Gold (gold) | 255-204-0 | FF-CC-0 |
| 18. Critical tower | Black (black) | 0-0-0 | 0-0-0 |
| 19. Objects (receiving data) | White (beige) | 255-255-255 | FF-FF-FF |
| 20. Objects (not receiving data) | Red (green/brown) | 255-0-0 | FF-00-00 |
| 21. Quick summary | White (beige) | 255-255-255 | FF-FF-FF |
| 22. Column labels | White (beige) | 255-255-255 | FF-FF-FF |
| 23. Row labels | White (beige) | 255-255-255 | FF-FF-FF |
| 24. Text on background | White (beige) | 255-255-255 | FF-FF-FF |
| 25. Background | Rose (tan/gray) | 255-153-153 | FF-99-99 |
| 26. Data suppression | Medium blue (medium blue) | 0-102-255 | 0-66-FE |

Other embodiments are contemplated.

What is claimed is:

1. A method of displaying information to a user, comprising:

using a computer to determine categories of information to be displayed; and displaying said categories with each color representing a specific category, one category being an alarm category and another category being a non alarm category, wherein each of said colors representing categories for alarms and for said another category being colors which can be perceived by both red and blue dichromats.

2. A method as in claim 1, further comprising allowing a color scheme for said colors to be changed.

3. A method as in claim 1, further comprising selecting if a person viewing the display has a color blindness; and changing color schemes if the user has a color blindness.

4. A method as in claim 1, wherein said colors include yellow and blue.

5. A method as in claim 1, wherein said categories of information include normal information, information that represents an alarm condition, and information that represents a warning condition.

6. A method as in claim 5, wherein an alarm condition is displayed in red for a normal view and in a color other than red for a color blind view.

7. A method as in claim 1, wherein said colors include a gold alarm, and a blue warning.

8. A method as in claim 1, wherein said colors include a black alarm and a gold warning.

9. A display system, comprising:

a computer display system;

a plurality of sensors, said plurality of sensors operative to receive inputs from a plurality of monitored sensing elements;

a computer based monitoring system, monitoring said sensors and determining information therefrom including categories of information to be displayed, with each color representing a specific category, one category being an alarm category and another category being a non alarm category; and said monitoring system determining whether said information represents an alarm, and changing a color of that information which represents an alarm to a different color, and further comprising a user interface part, which is operative to allow a user to enter information indicative of color blindness, and to change said colors responsive to said information, wherein each of said colors representing categories for alarms and for said another category being colors which can be perceived by both red and blue dichromats.

10. A display system as in claim 9, wherein a background is gray, alarms are blue, yellow and black, and normal colors are green.

11. A display system as in claim 9, wherein said colors for the color blind include colors other than red, green, and yellow.

* * * * *